United States Patent [19]

Brown

[11] 4,373,889

[45] Feb. 15, 1983

[54] HYDRAULIC PRESS ASSEMBLY

[75] Inventor: Leonard Brown, Levittown, Pa.

[73] Assignee: Crossley Machine Company, Inc., Trenton, N.J.

[21] Appl. No.: 234,172

[22] Filed: Feb. 13, 1981

[51] Int. Cl.³ .............................................. B29C 3/00

[52] U.S. Cl. .................................. 425/150; 425/451.2

[58] Field of Search .............................. 425/150, 451.2

[56] References Cited

U.S. PATENT DOCUMENTS 2,689,978 9/1954 Roger .............................. 425/451.2

3,704,973 12/1972 Renfrew ...................... 425/451.2 X 4,106,885 8/1978 Poncet ......................... 425/451.2 X

*Primary Examiner*—Thomas P. Pavelko

*Attorney, Agent, or Firm*—Nelson E. Kimmelman

[57] ABSTRACT

A hydraulic press having an upper ram-die subassembly is lowered hydraulically toward a mold cavity at a relatively high speed while resting by gravity on lower sets of nuts attached to the lower ends of piston rods. When the upper die comes to rest on the pulverulent material in the cavity, the piston rods continue their downward movement through passageways in the ram. At a predetermined distance sensed by a sensor on a set of upper nuts located on the rods above the ram cooperating with a switch on the ram itself, the ram continues downward at a much slower speed against the material with very high pressure for an initial stroke and then is retracted for additional strokes to "de-air" the powder (optional). Finally, after de-airing, the ram-die combination effects the final forming operation on the powder in the cavity.

10 Claims, 9 Drawing Figures

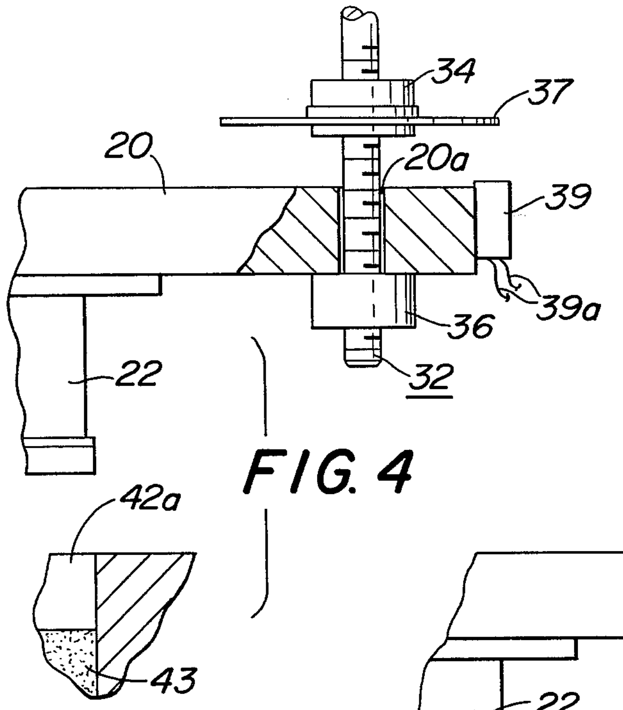
FIG. 4
FIG. 5
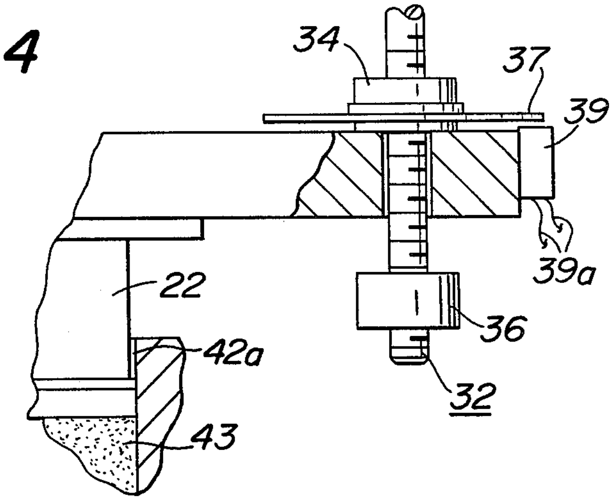
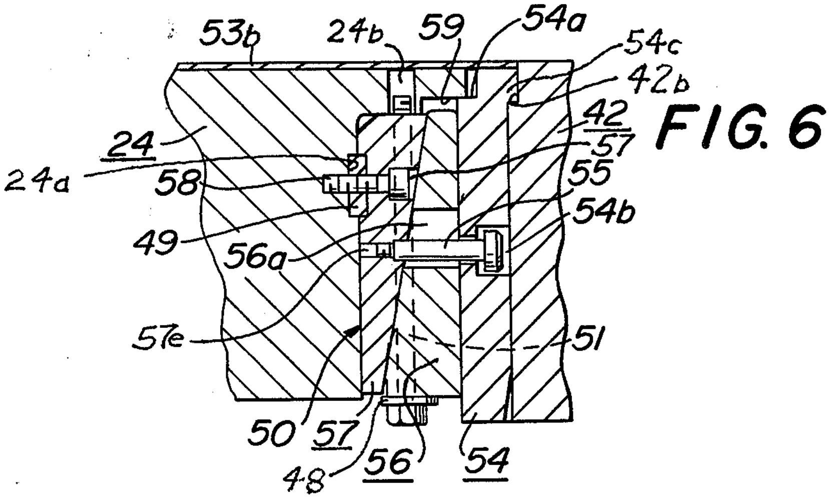
FIG. 6

HYDRAULIC PRESS ASSEMBLY

BACKGROUND OF THE INVENTION

1. Field of the Invention

This invention relates to forming apparatus operating at high pressure and, especially, to hydraulic presses for compressing pulverulent materials or the like.

2. Prior Art

Presses used to compress ceramic powders into predetermined shapes have conventionally involved friction-driven screw rams such as shown in U.S. Pat. No. 1,503,619 to Zeh or 1,790,041 to Crossley. U.S. Pat. No. 3,604,076 to Leonard Brown, et al. is a later form of this type of machine in which the ram-upper die combination is hydraulically raised and lowered. In it an independent friction-driven, screw-operated mechanism performs the preliminary "de-airing" step (optional) as well as exerting high pressure compression on the floating ram-die assembly as it rests on the pulverulent material.

The hybrid mechanism of the Brown, et al patent referred to above employed hydraulic piston rods passed through flanged portions of the upper die assembly, with a set of lower nuts screwed on the rods below the die assembly and a set of upper nuts screwed to the ends of the rods above the die assembly. As the upper die entered the mold cavity, the die assembly rested upon and was supported by the lower set of nuts. When the upper die rested upon the powder solely by its weight, the flanges on the ram were above, not in contact with, the set of lower nuts. When the friction-driven pressure hammer was lowered to force the upper die assembly downward with high pressure against the powder, the flanges of the ram were forced downward again into contact with the upper surface of the lower nuts. Switches on the ram cooperating with switch elements on a side vertical member signalled the control console to energize the friction disc which rotated the pressure screw to produce the hammering of the die assembly for the de-airing or final forming operations. Normally, the upper set of nuts were not used in either of these operations.

U.S. Pat. No. 3,225,410 to Boyer shows a wholly-hydraulically operated press wherein there is a ram from which, in a lost-motion relation, an upper die subassembly is suspended. That press has piston rods to which the ram is fixedly attached to lower the ram-upper die combination at a rapid speed into contact with the powder to be compressed. Then a hydraulically-operated hammer is made to produce repeated high pressure impacts downwardly on the upper die subassembly to de-air and/or produce the final compression of the powder to be formed.

The prior art left something to be desired insofar as its cyclic rate was concerned as well as its simplicity and reliability of operation.

It is therefore among the objects of the present invention to provide a hydraulic press with a considerably improved cyclic rate of operation and which employs a fast, simple and reliable mechanism.

BRIEF SUMMARY OF THE INVENTION

A press or the like has a ram assembly to which a forming member is attached. A predetermined number of elongated members pass through respective apertures in the ram and, by means of lower stop means fixed to their lower ends, solely support the ram during the initial part of its descent in a forming cycle. Upper stop means are also affixed to the rods above the ram. Means are provided for sensing when the downward movement of the ram is arrested as the forming member encounters the material to be formed. The sensing means produces a signal when this occurs which is communicated to the main power unit. The power unit thereafter hydraulically drives the ram downwardly at a slower rate but with much greater force than during the initial part of the descent.

BRIEF DESCRIPTION OF THE DRAWINGS

FIG. 4 is an enlarged fragmentary view, partly in section, of part of the apparatus shown in FIG. 1;

FIG. 5 is a fragmentary, enlarged view of part of the apparatus shown in FIG. 1, but where the ram-lowering rods have continued their downward descent through the apertures in the ram just before the upper nuts are in position to exert downward pressure on the ram; and FIG. 6 is an enlarged fragmentary and sectional view of a correspondingly designated section of the apparatus shown in FIG. 1.

DETAILED DESCRIPTION OF THE DRAWINGS

Figure 1:
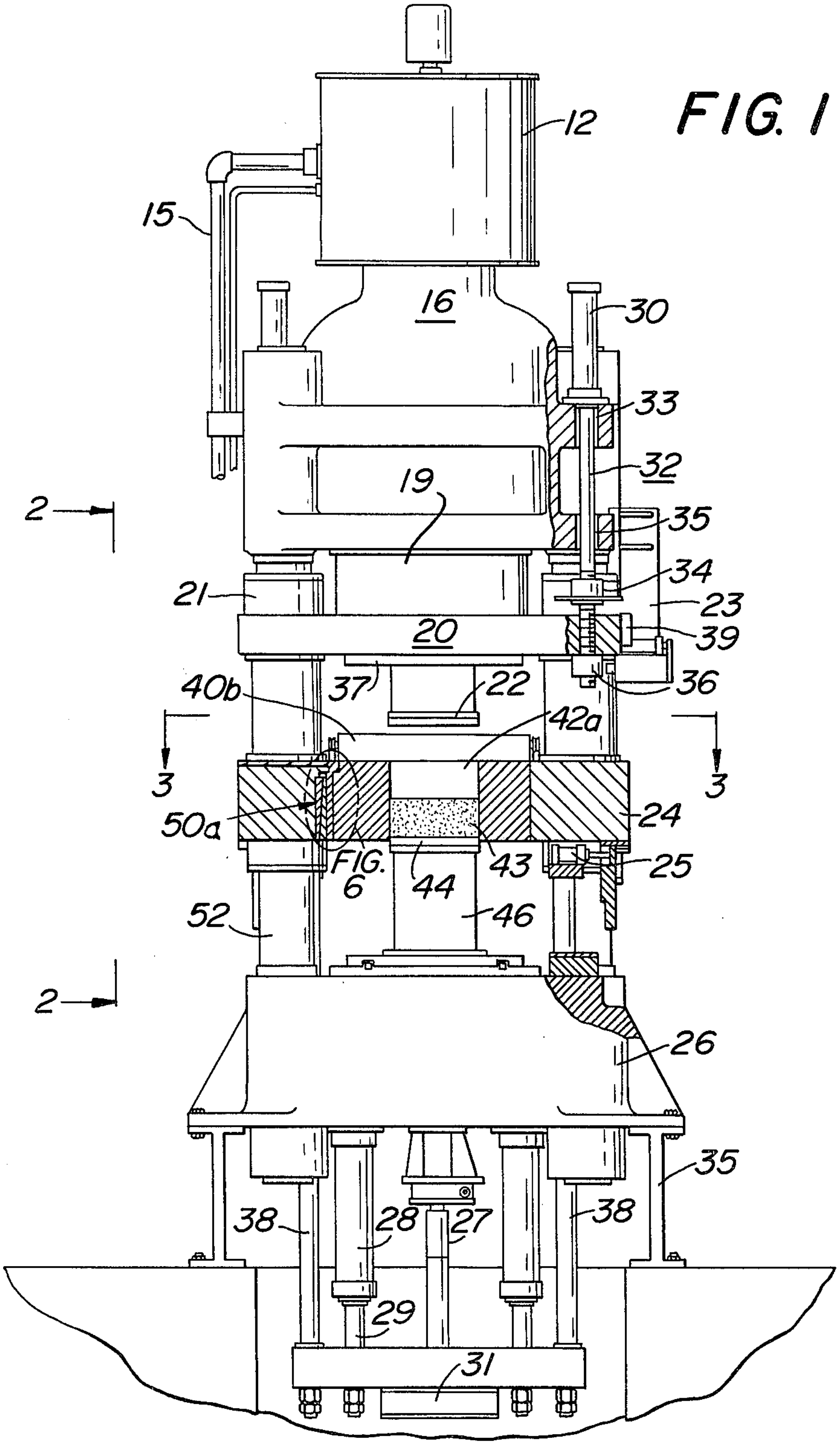
FIG. 1 is a side elevation view, partially in section, of the hydraulic press or the like in accordance with the present invention wherein the ram is shown resting solely on the lower set of nuts.

Referring to FIGS. 1–5, the hydraulic press according to the present invention is shown generally at the numeral 10. It has at its top a surge tank 12 for hydraulic fluid from which hydraulic lines 14 and 15 extend to a hydraulic control panel (not shown). It has a main press head 16 which is a single casting through which the upper ends of shafts or columns 17 extend. This casting incorporates a cylinder for the hydraulic fluid that drives the piston 19 which is bolted or otherwise connected to the main ram 20.

Piston rods 32 attached to pistons in jack cylinders 30 pass through apertures 33 and 35 in the head 16. A vertically movable main ram 20 has apertures **20*a* through which the threaded lower ends of rods 32 pass. Ram 20 is cast integrally with bearings 21 surrounding shafts 17 and has a lower plate 37. Lower nuts 36 are screwed onto the lower ends of the rods 32 and the ram rests solely by gravity on these nuts through most of its descent as it approaches the mold cavity 42*a***.

Also attached to the main ram and depending therefrom is an upper die holder 22 to whose lower surface an upper die **22*a* is attached which is so dimensioned as to move snugly into the die cavity 42*a* formed within the mold box 42. The mold box 42 is maintained in position within the mold case 24 solely by wedge assemblies 50 indicated generally within the ellipse (see FIG. 6). Case 24 is also movable vertically, its bearings 24*a* engaging the columns 17. The mold case 24 is supported on rods 38 which pass through holes in the press bed 26 which rests on I-beams 35. The lower ends of rods 38 are attached to a slab 41. Piston rods 29 extending downwardly from cylinders 28 fixed to the underside of the bed 26 are constructed to raise or lower the slab 41 which, in turn, raises or lowers the rods 38 to which the mold case 24** is attached at their upper ends.

There is also a stationary lower mold assembly comprising a lower mold support 46 which rests upon the top horizontal surface of the bed 26. At the upper end of the support 46 the lower die member 44 is affixed. Member 44 has a cross-section which is substantially congruous with the cross-section of the mold cavity 42*a* so that when ceramic material 43 is placed in the cavity, it cannot escape downward past the lower die.

An automatic mold cavity filler assembly 40 is located on a horizontal extension essentially co-planar with the top of mold case 24. It is attached to and operated reciprocally by a piston assembly 40*a* to which a feed box 40*b* is connected. Box 40*b* is filled with ceramic "dust" or the like so that, at the beginning of a cycle of operation, it can be moved by assembly 40*a* into position over the mold cavity 42*a* whereupon its contents 43 are discharged therein. The hydraulically operated apparatus shown at 60 is made to move the lower die assembly 46 and the mold box laterally and to bring in a new die as required.

For the sake of safety, but not constituting part of this invention, several devices are employed. Shown at 23 is a bracket holding a safety latch, hydraulically operated, which prevents the ram assembly from falling should the hydraulic system develop a fluid leak, for example. A similar apparatus 25 prevents dropping of the mold case 24. Element 27 is a vertical member which engages a gear reduction unit to prevent unwanted vertical movement of the mold case.

At the beginning of a cycle, the jack cylinders 30 and their associated piston rods 32 have been hydraulically actuated by the hydraulic console so as to be in their highest position (FIG. 1). The main ram assembly 20 is also in its highest position, supported by the lifting action of the upper surface of lower nuts 36 attached to the ends of rods 32. Safety latch 23 is in its safety position. When the mold cavity has been filled and the automatic charger 40 is reciprocated outwardly out of the way, latch 23 retracts and a pre-fill valve located (but not shown) in tank 12 opens. This allows hydraulic fluid to continue to flow into the main hydraulic cylinder above the piston during the descent of the ram 20. At the same time, the control panel mechanism actuates the jack ram cylinders 30 to move the rods 32 downward, the ram 20 resting upon the nuts 36, at a fast speed such as about 600 inches per minute.

The descent of the main ram assembly 20 continues in this fashion until the upper die holder 22 attached to it enters the mold cavity 42*a* and starts to bear down upon the dust 43. Its weight alone will continue to compress the dust 43 until the compressed dust resists further downward movement of the upper die. When this happens, the rods 32 will nevertheless continue their downward descent through the apertures 20*a* so that the upper surfaces of the lower nuts 36 become disengaged from the ram. Continued downward movement of the rods 32 causes the lower surfaces of the upper nuts 34 to approach the upper surface of the ram 20. Affixed to at least one of the upper nuts 34 is a disc or ring 38 of metal which therefore approaches the upper surface of the ram. Attached to the end of the ram in the vicinity of the disc 38 is a proximity detector or switch 39 that is set to respond to the approach of the ring to a predetermined distance from it (FIGS. 4 and 5). At this distance, proximity switch 39 signals the control panel to close the prefill valve. This shuts off flow of oil into the main cylinder which drives the main piston 19 so that the ram 20 can immediately thereafter be hydraulically impelled downwardly with tremendous force, albeit at a much slower rate.

When high pressure is exerted, the speed of descent of ram 20 decreases first to about 50 inches per minute, achieving pressures up to 2,000 lbs. per square inch and then, at 20 inches per minute achieving pressures up to 3,800 lbs. per square inch. A preset timer in the hydraulic control panel, not shown, determines the period for which the dust is compressed at the high pressures. At the end of that period, the pressure is released and the stripping of the mold box from the product begins when the pressure is reduced to a predetermined level. This level is sensed and the hydraulic system is signalled to start to move the mold case 24 mold box 42 assembly downward by moving piston rods 29 downwardly thereby moving rods 39 down also. When the mold case 24 begins to descend, a timer is energized which permits the ram 20 to rest on the pressed product for a predetermined period at which time the hydraulic system is signalled to move the jack ram piston rods 32 up at a fast speed (600 inches per minute) whereupon the ram-die subassembly 20, 22 is lifted out of contact with the pressed item 43. Meanwhile, the mold case 24 continues to descend until its top is approximately level with the bottom of the pressed product 43 whereupon the automatic means 40 moves inwardly to push the pressed product 43 out of the way. Thereafter, when the mold case 24 has again been moved up to the correct level, cavity 42*a* may again be filled at the beginning of the next cycle.

A variation of the form of the signal producing detection system shown in FIGS. 4 and 5 could be easily accomplished by mounting the disc 37 on a lower nut 36 instead of on an upper nut. The circuitry in the control console (or anywhere else) would be adjusted to respond to the loss of proximity as the lower nut continues downwardly after downward motion of the ram assembly is arrested by the resistance of the ceramic dust. Of course, photoelectric systems or other conventional detecting systems could aternatively be used too to measure the slippage between the downward movement of the rods 32 with respect to the ram assembly.

In some pressing operations, "de-airing" of the dust 43 is desired so that air is quickly removed from it to obtain maximum possible product density and prevent formation of any "air cracks" in the finished product. It is known in the art to de-air the powder by subjecting the dust 43 to a series of pulses of compression followed by pulses of decompression. It is highly desirable that this be accomplished as quickly as possible. In the apparatus described, de-airing is accomplished by alternately 1. lifting the ram 20 by moving the rods 32 upwardly so that the lower nuts cause decompression and then 2. moving the rods downwardly shortly thereafter so that the disc 37 approaches switch 39 again signalling the console to actuate piston 19 to move ram 20 downwardly again. This time, however, the console is so programmed that instead of allowing the pressure to build up to 3800 psi as in a cycle where no de-airing occurs, it is allowed to attain only about 2000 psi or less. When this pressure is sensed, the pressure is released until it is in the vicinity of 500 psi whereupon the process is repeated and the pressure is allowed to build up again, and so forth, for a predetermined number of times.

By providing this unique system of having the main ram decoupled from the main hydraulic drive during its rapid descent toward the workpiece and the use of the upper and lower nuts 34, 36 as explained above, it is possible to improve significantly the productivity of such apparatus. The use of the sensing ring 37 and the proximity switch 39 enables the ram assembly to be lowered very fast yet, when the ram rests solely under the influence of gravity upon the dust 43, it enables the apparatus to shift from the relatively low pressure phase of compression to the very high compression phase very rapidly. This is useful both in de-airing and non de-airing operation. Whereas existing ceramic presses were capable of producing 4–4½ cycles per minute, the present system using the floating ram, double nuts, and proximity sensing can increase the rate to 5½–6 cycles per minute. Precentagewise, this is a very great improvement which increases production and efficiency considerably.

While a disc-proximity switch assembly is shown which detects the imminence of the relative positions of the ram and the lowering piston rods 32, many other types of sensors could also serve alternatively. Photoelectric or contact switch systems could be acceptable substitutes.

Mold Box Assembly

While not part of the invention claimed herein, there is also shown a novel structure for positioning the mold box 42 fixedly within the mold case 24. Some prior art structures had a mold box comprising a fixed rear beam, a front beam and two intermediate transverse side beams with bolts passing inwardly through the front and rear beams to threaded passageways in the side beams. Such prior art structures has many disadvantages. In the first place, they were keyed to the mold case, thus requiring considerable machining. In the second place, the nature of their construction required removal of at least one of the beams to enable insertion of the lower die horizontally, an operation which was time consuming as it required removal of numerous bolts and also could be difficult and awkward. Finally, and most importantly, when the mold box was assembled within the mold case and subjected to the extremely high pressures produced by the downward movement of the upper ram-die assembly, the vertical pressure acting upon the ceramic material produced resultant intense outward pressures on the walls of the mold box. This caused them to be pushed outwardly and to bulge so that the mold box did not maintain the requisite geometric integrity in the mold cavity. Since it is necessary to maintain very small tolerances in the mold cavity, the useful life of the mold box was considerably shortened. So-called "fins" on the pressed product caused by the yielding walls of the mold box significantly reduced the press's productivity. If the mold's tolerances were so upset by the pressure strains as to be unusable, fabrication of new mold boxes entailed considerable additional expense.

In accordance with this construction, there is provided a key-less wedging mechanism 50, indicated within the broken line oval of FIG. 1 and also shown in FIGS. 2, 3, 6 and 7. This mechanism locks a one piece mold box 42 within the mold case 24 in such a way that it will withstand the tremendous pressures exerted by the ram 20 and the upper die 22. Furthermore, its construction enables the mold box to be fitted within the mold case 24 from below. Its simplicity enables the insertion or removal time of the mold box to be cut from say, a conventional 5 hour period, to 1½ hours. This results in higher productivity because of less down time.

Two wedge assemblies 50*a*, 50*b* are shown in FIGS. 1, 2, 3, 6 and 7 holding a mold box 42. Wedge assembly 50*a* is positioned in the left (short) side wall position as shown in FIG. 1. Another one, 50*b* is installed in the front wall portion shown on the right in FIG. 2. The two wedge assemblies are essentially identical except that 50*b* is much longer so it requires a greater number of horizontal and vertical bolts to fix it in position.

A downwardly and outwardly tapering wedge 57 is fastened by machine screws 58 which pass through holes 57*b* into threaded apertures formed in case 24. These screws also pass through apertures (not shown) in a key 49 disposed within a horizontal channel defined by facing horizontal grooves 24*a* and 57*d* formed in the mold case 24 and wedge 57 respectively. An upwardly tapering wedge 56 having vertical slots 56*a* is movable essentially vertically with respect to wedge 57 thereby changing the horizontal location of its untapered vertical surface.

The two angled surfaces of wedges 56 and 57 are brought into contact with one another so that the hollowed-out, partially conical portions 56*b* in wedge 56 face respective hollowed-out portions 57*e* in wedge 57. Smaller, partially tubular vertical grooves 52*a* lead from the bottom of wedge 57 to portions 57*e*. Similar, partially-tubular, angled grooves or passageways 52*b* connect portions 57*e* with one another. Vertical inlet grease passageways 56*c* are formed in wedge 56 having upper terminal openings in the inclined surfaces of wedge 56.

Vertical bolts 51 have associated washers 48 and pass upwardly, first through hollowed-out portions 56*b* in the movable inner wedge 56, then through hollowed-out portions 57*e* in wedge 57, then through vertical threaded apertures 57*a* communicating with portions 57*e* and finally into the hole 24*b* in mold case 24.

Figure 2:
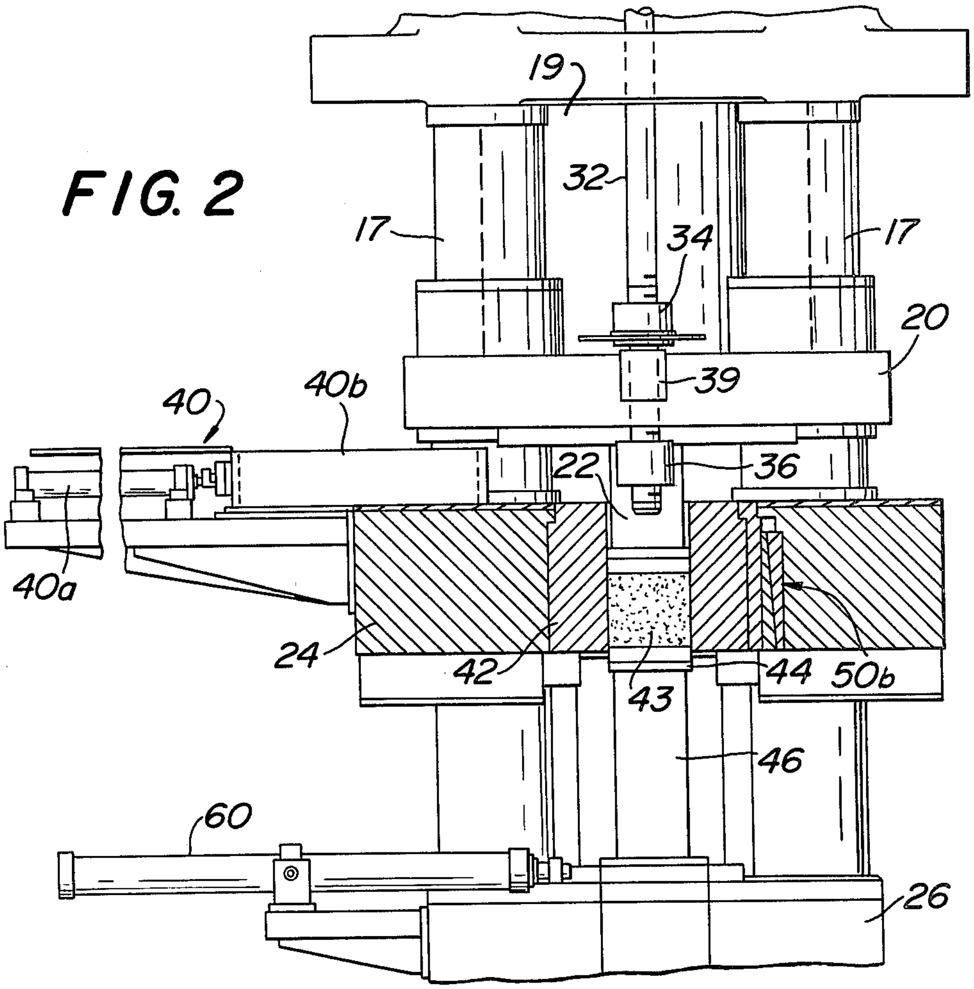
FIG. 2 is a fragmentary, front elevation view of part of the apparatus shown in FIG. 1, the ram-die assembly being shown with the upper die supported solely by the powder in the mold cavity.

As may be seen from FIGS. 1, 2 and 6, a spacer plate or member 54 having an upper shoulder 54*a* and a projecting ledge 54*c* is also assembled to the wedge assembly 50*a* in this particular construction. It has counterbored apertures 54*b* drilled horizontally through which, via slots 56*a*, shoulder bolts 55 pass. Bolts 55 also pass through slots 56*a* and terminate with their threaded ends screwed into threaded apertues 57*e* in the fixed outer wedge 57. These spacer members 54 are not essential in all forms of novel construction, but are useful to enable a standard press to accommodate mold boxes of different outer dimensions.

Figure 3:
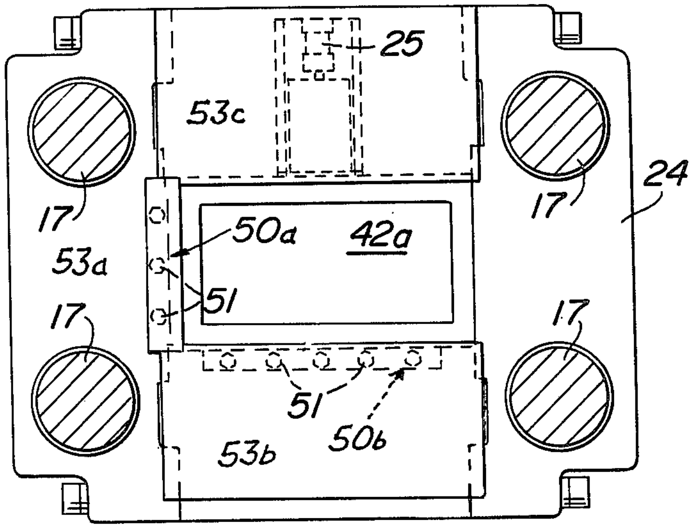
FIG. 3 is a sectional view taken along the lines 3—3 in the direction indicated by the section line 3—3 in FIG. 1.
Figure 7:
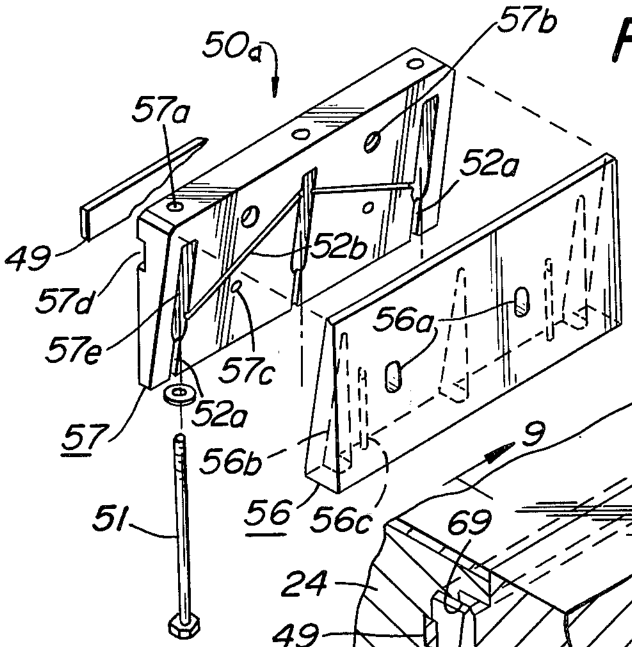
Figure 8:
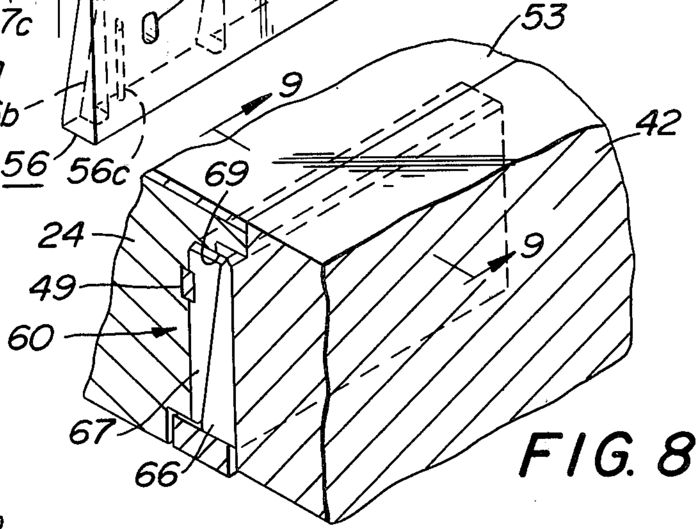
Figure 9:
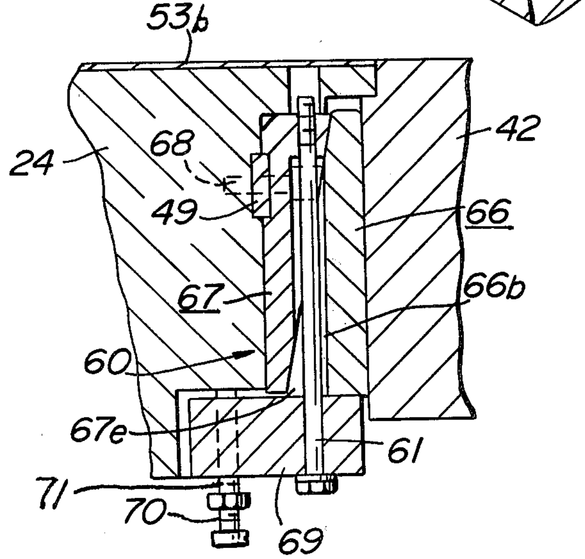

Shown in FIG. 3 from above are three dust-protective and/or wear plates 53*a*, 53*b* and 53*c*. Plates 53*b* and 53*c* are inset onto the top of the press bed opposite one another. Plate 53*a* is placed on one short side covering the wedge assembly 50*a* and is in the path of the reciprocating dust box (FIG. 2, 40*b*) which fills the mold cavity 42*a* with ceramic material 43 at the beginning of each cycle of operation. Since ceramic dust is abrasive and consists of very fine particles, plate 53*a* is a replaceable member made of abrasion-resistant steel that enables the top of the mold case 24 to be kept level with the top of the mold box 42. It also helps keep the dust from infiltrating downward into the spaces in wedge assembly 50*a*. Plates 53*b* and 53*c* are disposed along the long front and back sides of the mold case 24, the plate 53*c* serving only a wear-protection function. Plate 53*b* is also abrasion-resistant, but serves additionally to prevent dust infiltration downward into wedge assembly **50*b*** below it.

What is claimed is:

1. A hydraulic press or the like, comprising:

(a) a hydraulic power unit, (b) a first plurality of vertically mounted piston cylinders coupled to said power unit and having respective downwardly extending piston rods arranged for movement in a vertical direction, (c) a ram die assembly adapted to be coupled to said power unit and having a plurality of vertical apertures formed therein, said assembly also including an upper die attached to said ram, said piston rods being arranged to pass with clearance through respective ones of said apertures, (d) a plurality of upper and lower stop means positioned toward the lower ends of said rods respectively above and below said vertical apertures in said ram assembly and being separated from one another by a predetermined space greater than the depths of said apertures, said ram assembly being movable downwardly at a relatively fast rate while being suspended principally by said lower stop means during most of its downward descent during a cycle of operation, (e) a mold case below said ram assembly for holding a demountable mold box having a generally centrally-located aperture in the path of said upper die, (f) a lower die disposed below said mold case and aligned with the aperture thereof, the upper surface of said die being positioned to move into said mold box aperture and cooperate therewith to define a mold cavity in which material to be processed is placed, (g) means associated with at least one of said stop means and with said ram assembly which cooperate to produce a signal when said upper die has its downward movement arrested by its contact with said material in said mold cavity and is supported substantially only thereby whereupon said piston rods continue their downward movement, and (h) means coupled to said signal producing means and to said power unit for causing, in response to said signal, said power unit to be coupled to said ram assembly to drive it further downwardly at a relatively slow rate but with an extremely high forming force.

2. The press according to claim 1 wherein said stop means are nuts and said (g) means comprises a metallic member affixed to at least one of said rods at or near said upper stop nut and a cooperating proximity switch attached to said ram near said metallic member.

3. A press or the like, comprising: (a) a main ram assembly which includes an attached forming member, said ram assembly having a number of vertical apertures formed in predetermined portions thereof, (b) first hydraulic power means adapted to be coupled to drive said ram assembly directly, (c) a predetermined number of elongated members passing with clearance through respective ones of said apertures which are powered by second hydraulic means and are constructed to move vertically at a relatively fast rate, said elongated members having at least respective lower stop means fixed to them below said apertures which enable said ram assembly to be suspended thereon during downward and upward movement of said elongated members, (d) means coupled to said ram assembly and to said elongated members for detecting when said elongated members continue to move through said vertical apertures a first predetermined distance relative to said ram assembly after said ram assembly comes to rest during its descent, said detecting means also producing a signal in response thereto, and (e) means responsive to said signal and coupled to said first hydraulic power means for thereafter impelling said ram assembly downward at a relatively slow rate but with a force considerably higher than the force exerted by said ram assembly when said signal is not produced.

4. A press or the like according to claim 3 wherein said elongated members also have respective upper stop means fixed to them above said apertures and wherein said predetermined distance is a selected distance between said upper stop means and a point on said ram assembly.

5. The press or the like according to claim 3 wherein, during the initial part of the descent of said ram assembly at a high rate of speed, said ram assembly is supported principally by said lower stop means and wherein said signal is produced when said forming member meets resistance to further downward movement by contact with a workpiece whereupon said ram assembly rests thereupon with a first pressure determined substantially only by its own weight, said first power means thereafter causing said ram assembly to exert a second pressure on said workpiece at a low rate of speed, said second pressure being considerably greater then said first pressure.

6. The press according to claim 3 wherein said upper and lower stop means are first and second nuts which are spaced from one another on said respective elongated means by a second predetermined distance which is greater than said first predetermined distance.

7. The press according to claim 4 wherein said means for detecting said first predetermined distance include means coupled to at least one of said stop means which cooperates with means coupled to said ram assembly for producing said signal.

8. The press according to claim 7 wherein said elongated members are hydraulically coupled to said second hydraulic power means toward the top of said press.

9. The press according to claim 3 wherein said stop means are the sole support of said main ram assembly during its descent at said relatively fast rate and until said forming member engages the material to be formed, said first hydraulic power means being substantially decoupled from said main ram assembly during said descent, and further wherein said stop means are the sole support of said main ram assembly during its ascent after a forming operation has been completed, said main ram being effectively decoupled from said first hydraulic power means during said ascent.

10. The press according to claim 3 wherein said (d) and (e) means are constructed to cooperate in also producing a series of repetitive up and down strokes to produce pressure pulses on material to be formed which have lesser amplitude than the pressure exerted on said material during a forming operation.

* * * * *